(12) United States Patent
Jaaskelainen et al.

(10) Patent No.: US 10,901,163 B2
(45) Date of Patent: Jan. 26, 2021

(54) HELIX HAND REVERSAL MITIGATION SYSTEM AND METHOD

(71) Applicant: Halliburton Energy Services, Inc., Houston, TX (US)

(72) Inventors: Mikko Jaaskelainen, Katy, TX (US); Jason Edward Therrien, Cypress, TX (US); Seldon David Benjamin, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 16/081,871

(22) PCT Filed: Apr. 25, 2016

(86) PCT No.: PCT/US2016/029183
§ 371 (c)(1),
(2) Date: Aug. 31, 2018

(87) PCT Pub. No.: WO2017/188925
PCT Pub. Date: Nov. 2, 2017

(65) Prior Publication Data
US 2019/0094480 A1    Mar. 28, 2019

(51) Int. Cl.
*E21B 19/22* (2006.01)
*G02B 6/44* (2006.01)
(Continued)

(52) U.S. Cl.
CPC ........... *G02B 6/4458* (2013.01); *E21B 19/22* (2013.01); *E21B 47/135* (2020.05); *G02B 6/4485* (2013.01); *G02B 6/52* (2013.01)

(58) Field of Classification Search
CPC ...... G02B 6/4458; G02B 6/4485; G02B 6/52; E21B 19/22; E21B 47/123
See application file for complete search history.

(56) References Cited

U.S. PATENT DOCUMENTS 770,651 A    9/1904   Peters et al.
1,958,598 A  *  5/1934   Trebes .................. H01B 13/26
                                                                57/6
(Continued)

FOREIGN PATENT DOCUMENTS

EP    1390789          3/2014
KR    20150054806      5/2015

OTHER PUBLICATIONS

International Search Report and Written Opinion of PCT Application No. PCT/US2016/029183 dated Dec. 15, 2016: pp. 1-12.
(Continued)

*Primary Examiner* — Aaron L Lembo
(74) *Attorney, Agent, or Firm* — Chamberlain Hrdlicka

(57) ABSTRACT

A cable introduction assembly that can include: a spool assembly including a spool having a first axis, the spool configured to retain a cable wound around the first axis in an undeployed mode; and a spool mount assembly configured to retain the spool and introduce the cable in a deployed mode into a conduit configured for a downhole environment, the conduit having a proximal end and a distal end, the cable in the deployed mode extending from the proximal end towards the distal end, wherein the spool assembly is configured to provide a handedness to the cable in the deployed mode.

12 Claims, 12 Drawing Sheets

(51) Int. Cl.
*G02B 6/52* (2006.01)
*E21B 47/135* (2012.01)

(56) References Cited

U.S. PATENT DOCUMENTS

| | | | | |
|---|---|---|---|---|
| 2,450,280 | A * | 9/1948 | Homon | A47L 13/06 |
| | | | | 140/71 C |
| 3,526,692 | A * | 9/1970 | Onaka | B29C 48/09 |
| | | | | 264/171.12 |
| 3,725,178 | A * | 4/1973 | Kleykamp et al. | B29C 48/30 |
| | | | | 156/393 |
| 3,823,590 | A * | 7/1974 | Lang | B21F 3/04 |
| | | | | 72/66 |
| 3,858,310 | A * | 1/1975 | Seleznev | H01F 41/08 |
| | | | | 29/604 |
| 3,877,860 | A * | 4/1975 | Putti | B28B 1/084 |
| | | | | 425/380 |
| 3,927,455 | A * | 12/1975 | Seleznev | H01F 41/08 |
| | | | | 29/737 |
| 3,989,431 | A * | 11/1976 | Martens | B28B 1/084 |
| | | | | 425/112 |
| 4,071,834 | A * | 1/1978 | Comte | G02B 6/4458 |
| | | | | 138/122 |
| 4,135,869 | A | 1/1979 | Loyer | |
| 4,207,127 | A * | 6/1980 | Loyer | B21F 3/02 |
| | | | | 156/50 |
| 5,339,378 | A * | 8/1994 | Simonds | G02B 6/4458 |
| | | | | 385/100 |
| 6,390,535 | B1 * | 5/2002 | Chapman | B60J 5/06 |
| | | | | 296/155 |
| 7,201,365 | B2 * | 4/2007 | Crawford | B66C 13/14 |
| | | | | 114/254 |
| 7,353,576 | B2 * | 4/2008 | Pavlov | B21F 25/00 |
| | | | | 29/432 |
| 7,419,139 | B2 * | 9/2008 | Pavlov | B21F 25/00 |
| | | | | 256/1 |
| 7,845,419 | B2 * | 12/2010 | Naumann | E21B 17/206 |
| | | | | 166/380 |
| 8,001,756 | B2 * | 8/2011 | Crawford | B66C 13/14 |
| | | | | 57/3 |
| 8,276,883 | B2 | 10/2012 | Heatley et al. | |
| 8,888,033 | B2 | 11/2014 | Hiebenthal | |
| 9,127,531 | B2 * | 9/2015 | Maida | E21B 47/123 |
| 9,644,435 | B2 * | 5/2017 | Naumann | E21B 17/20 |
| 10,392,880 | B2 * | 8/2019 | Boggess | B29C 53/20 |
| 2005/0279511 | A1 | 12/2005 | Adnan et al. | |
| 2012/0211231 | A1 * | 8/2012 | Erkol | E21B 17/028 |
| | | | | 166/338 |
| 2015/0378124 | A1 | 12/2015 | Michaelis et al. | |
| 2016/0090832 | A1 | 3/2016 | Mock | |
| 2019/0120141 | A1 * | 4/2019 | Ryon | F02C 7/232 |

OTHER PUBLICATIONS

Anonymous, "Tendril perversion," Wikipedia, last edited Jul. 6, 2018, retrieved Aug. 27, 2018: pp. 1-3, <https://en.wikipedia.org/w/index.php?title=Tendril_perversion&oldid=849064390>.

Goriely et al., "Spontaneous Helix Hand Reversal and Tendril Perversion in Climbing Plants," Physical Review Letters, Feb. 1998, vol. 80(7): pp. 1564-1567.

* cited by examiner

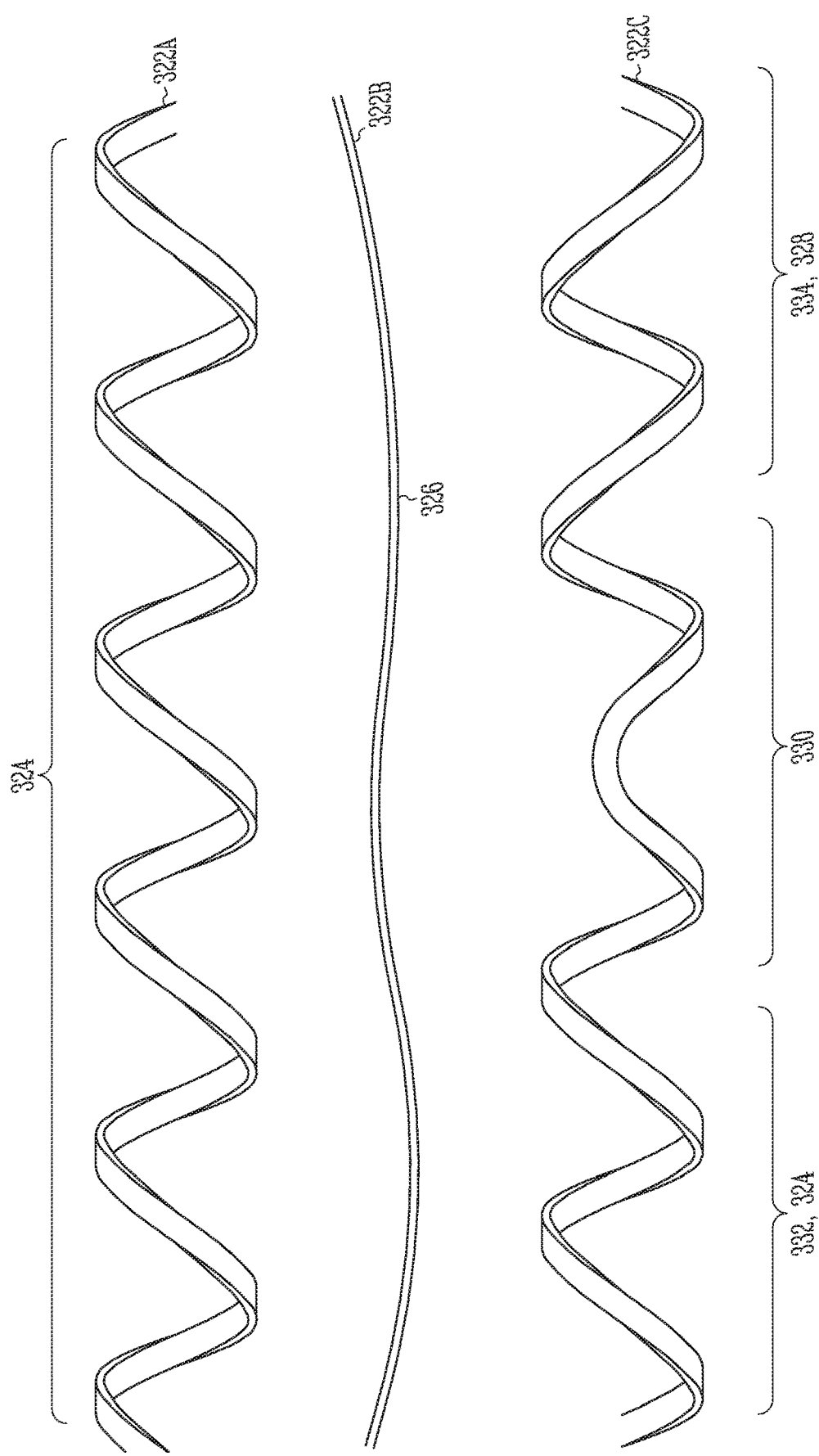

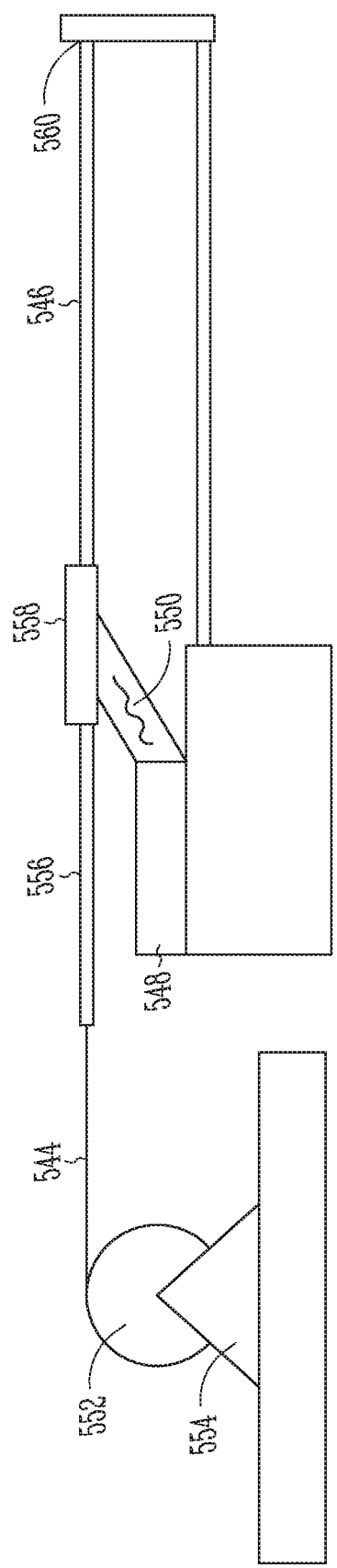

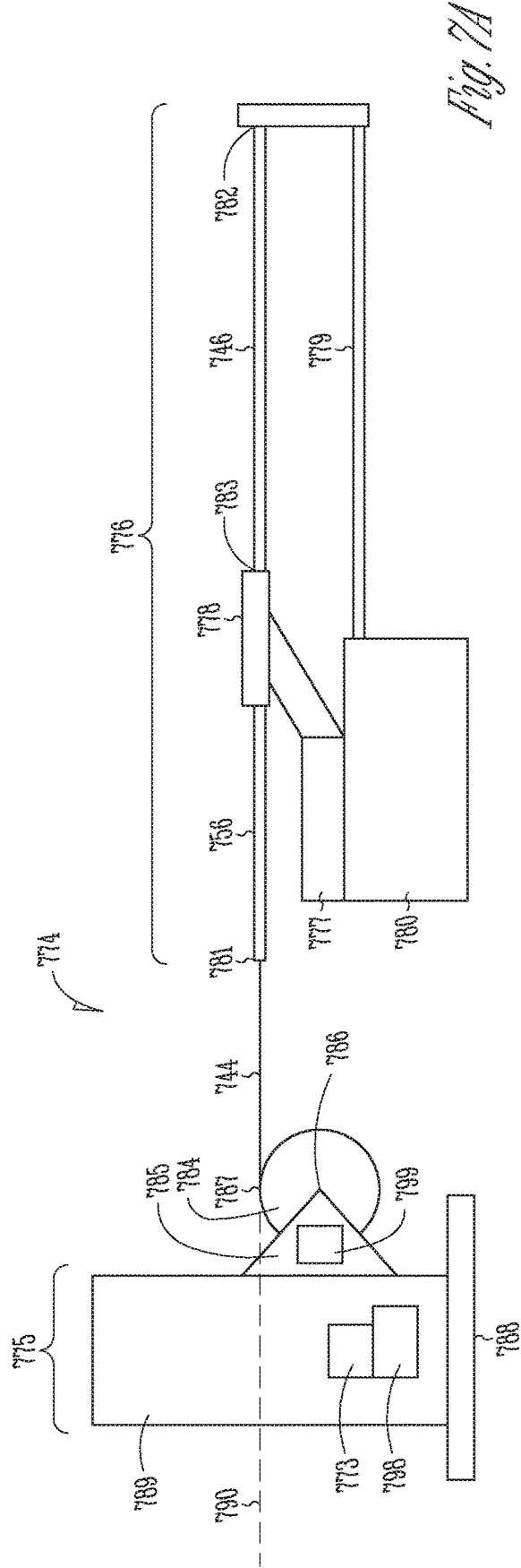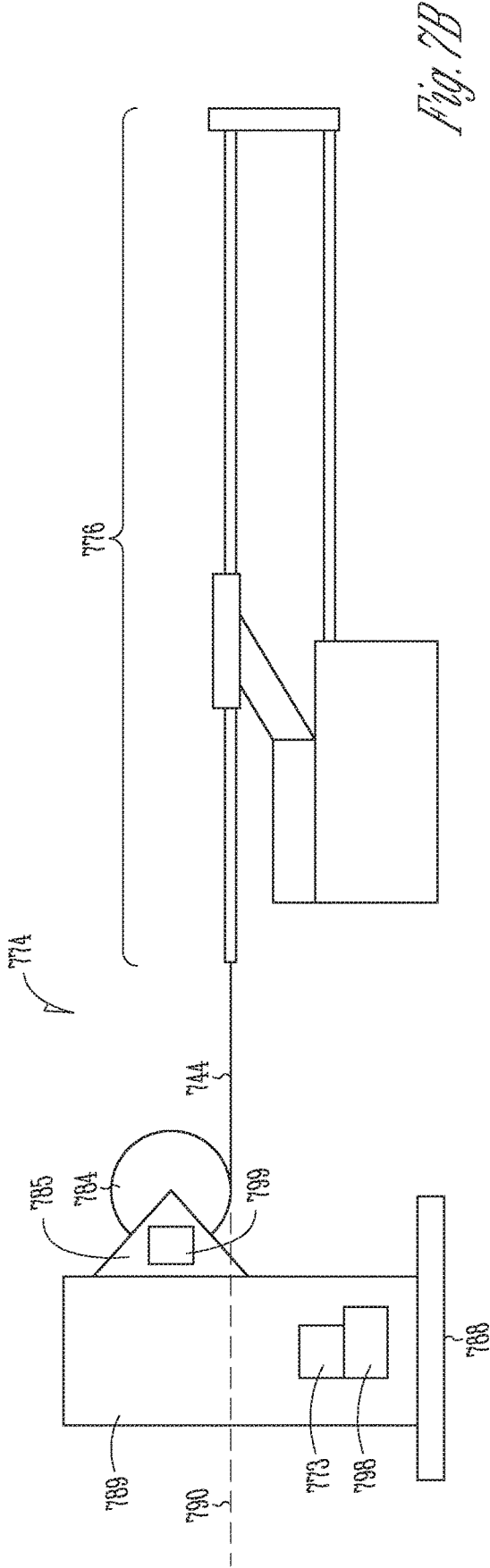

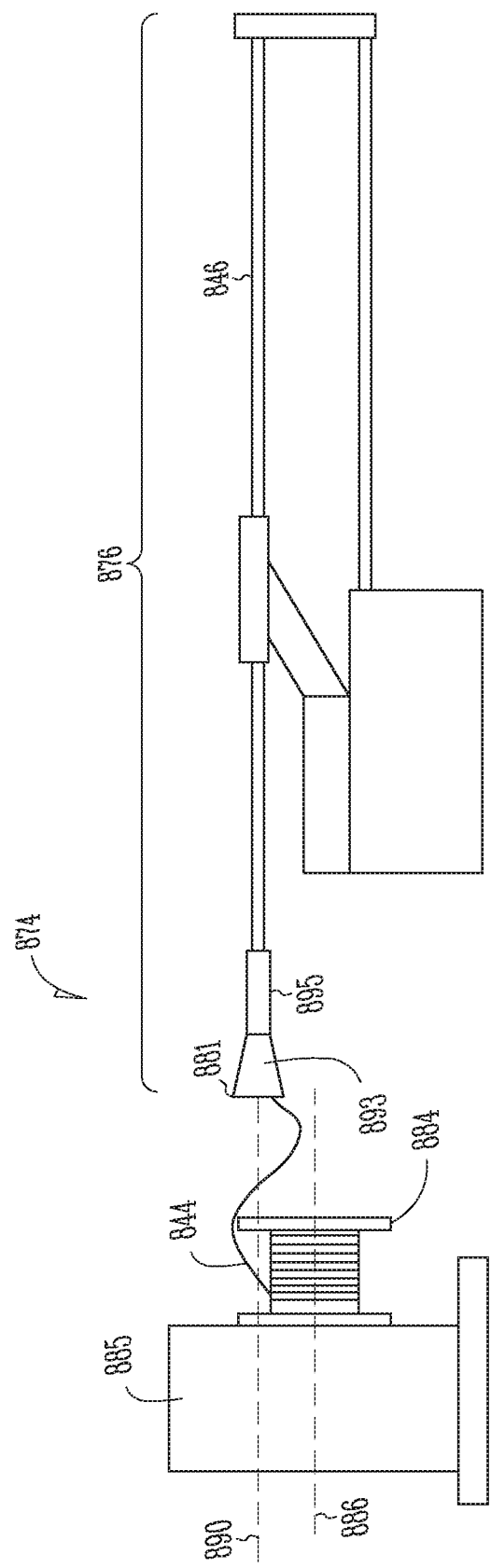

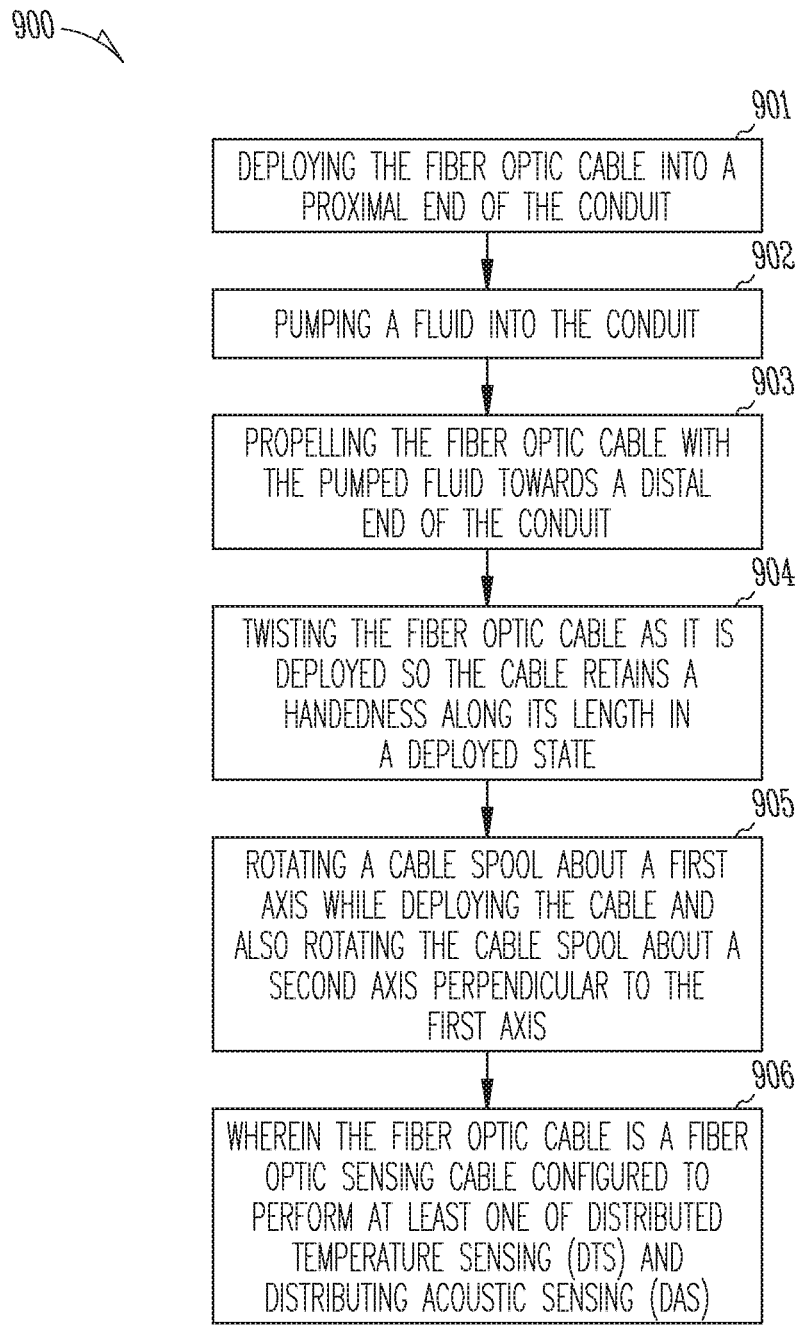

HELIX HAND REVERSAL MITIGATION SYSTEM AND METHOD

BACKGROUND

Fiber optic sensing cables are sometimes pumped into coiled tubing, and used for sensing environmental conditions during various oil field operations. The fiber optic cable can become kinked, and as a result, can fail or break. For example, cable failure can be caused by a spontaneous helix hand reversal.

BRIEF DESCRIPTION OF THE DRAWINGS

Some embodiments are illustrated by way of example and not limitation in the figures of the accompanying drawings in which:

FIG. 3 illustrates three possible states of a cable.

FIG. 5 illustrates a schematic drawing of a cable introducing device.

FIG. 7A illustrates a schematic drawing of a cable introduction device, in accordance with at least one example of the present disclosure.

FIG. 7B illustrates a schematic drawing of a cable introduction device, in accordance with at least one example of the present disclosure.

FIG. 8. illustrates a schematic drawing of a cable introduction device, in accordance with at least one example of the present disclosure.

FIG. 9 is a flowchart of a method of deploying a fiber optic cable into a conduit, in accordance with at least one example of the present disclosure.

DETAILED DESCRIPTION

Cables, such as fiber optic cables used in the oil industry, can include a torsional stiffness that sometimes opposes a coiling direction of the cable. If the cable is straightened, a spontaneous helix hand reversal can result, causing one section of the cable to have a coil in one direction (e.g. left hand helix) and an adjacent section to have a coil in the opposite direction (e.g. right hand coil). A small section between the coiled sections can be uncoiled and is known as a "tendril perversion" or "spontaneous helix hand reversal section". Throughout the rest of this application this section between opposite coil directions will be known as a "hand reversal section".

Figure 1:
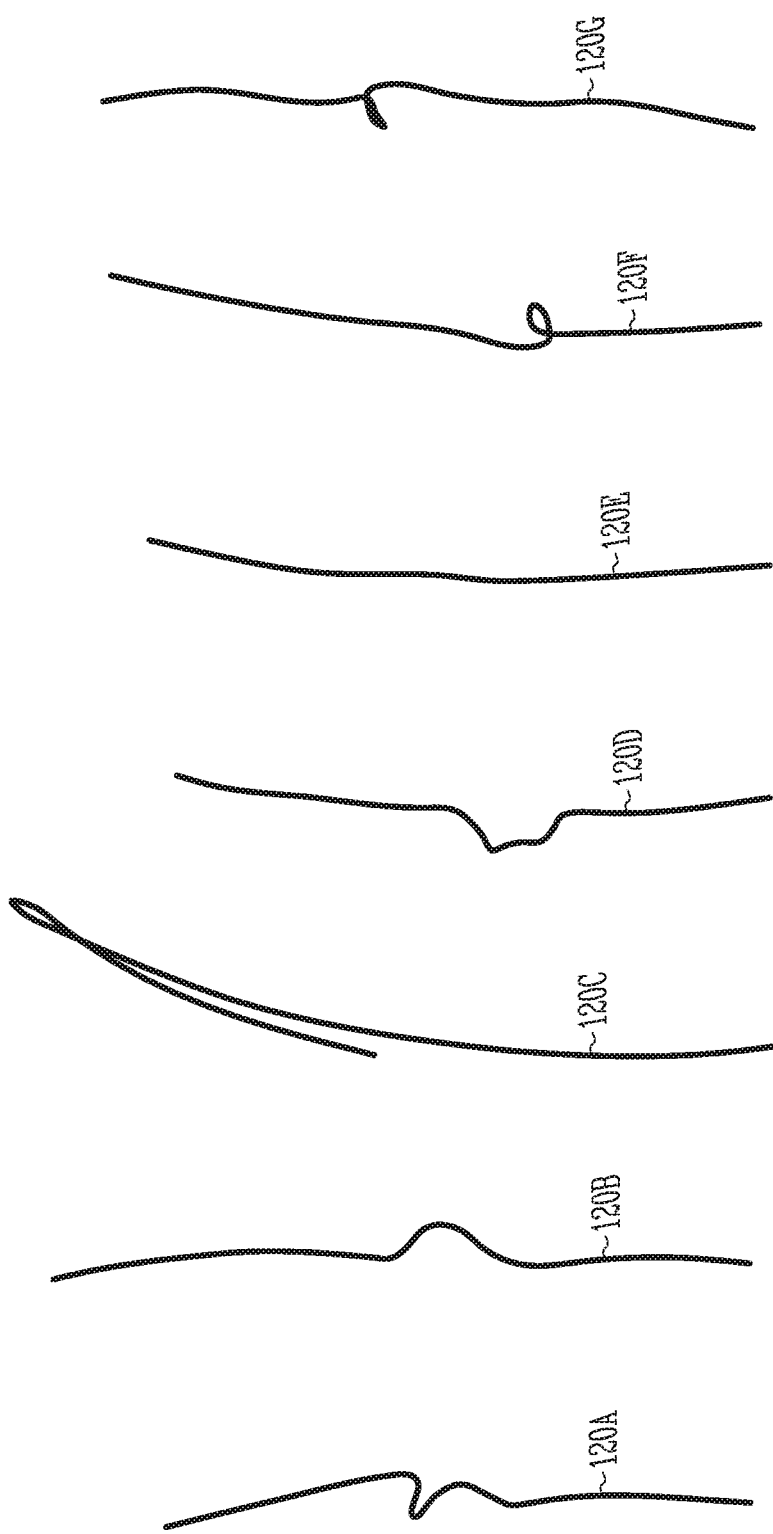
FIG. 1 illustrates examples of structural failures that may have occurred in a cable mechanically stressed by a spontaneous hand reversal.

FIG. 1 illustrates examples of structural failures that may have occurred in a cable mechanically stressed by a spontaneous helix hand reversal. Thus, failed cables 120A-G all may have occurred due to a spontaneous helix hand reversal in the cable.

Figure 2:
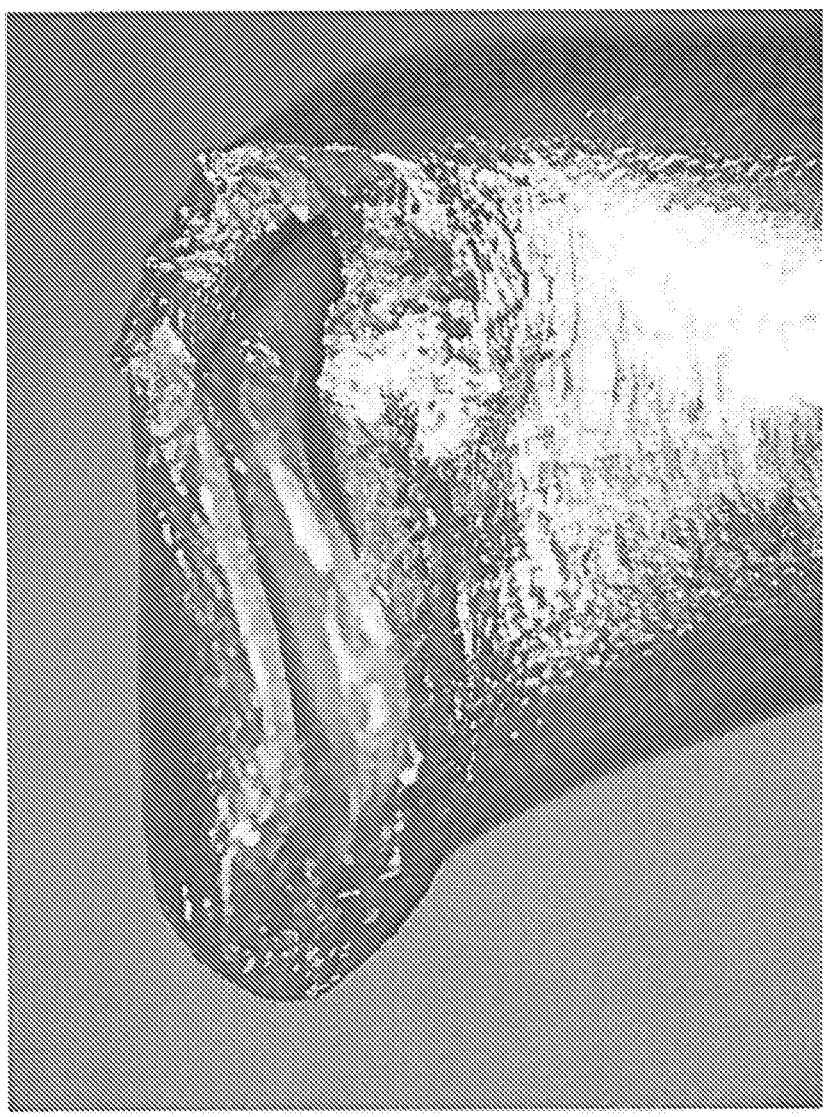
FIG. 2 is an image of a fracture surface of failed fiber optic cable.

FIG. 2 is an image of a fracture surface of failed fiber optic cable. The fiber optic cable 220 can be a fiber in metal tube (FIMT) type. The fracture producing the illustrated fracture surface may have been caused by a weak point in the cable due to mechanical stress from a spontaneous helix hand reversal.

FIG. 3 illustrates three possible states of a cable. The three cable states can include: 1) a helically coiled cable 322A that is all coiled in one direction, such as a left hand direction 324; 2) a helically coiled cable 322B that has been pulled into a straightened condition 326; and 3) after straightening and when straightening forces have been relaxed, the cable 322C can spontaneously produce a hand reversal section 330. The cable 322C can include a first section 332 coiled in one direction such as a left hand direction 324 and a second section 334 that is near the first section 332, and that is coiled in the opposite direction, such as a right hand direction 328. The section of the cable 322C where the handedness switches is the hand reversal section 330, which may produce a weak point in the cable 322C.

Figure 4A:
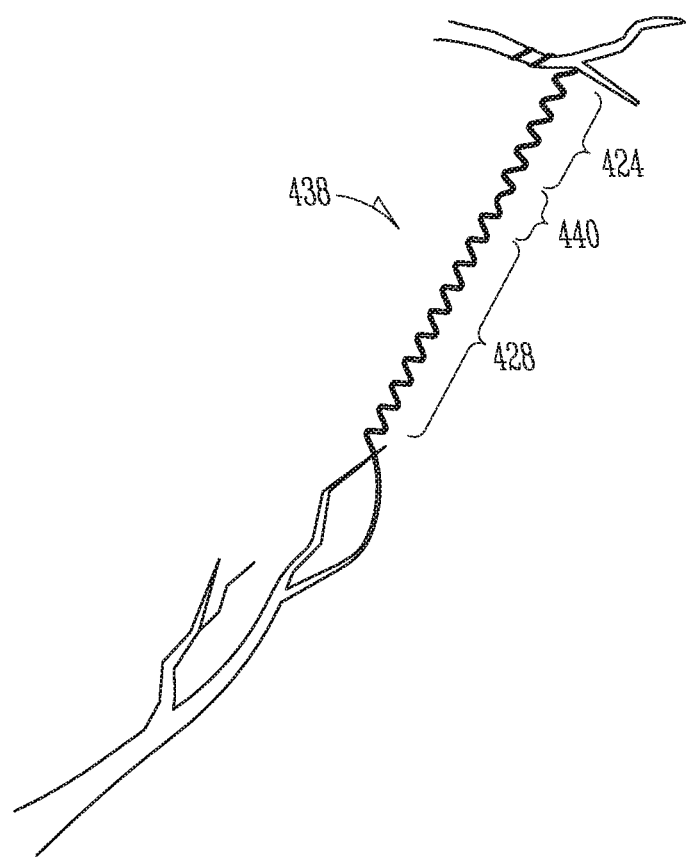
FIG. 4A illustrates a tendril perversion in *Bryonia Dioica*.

FIG. 4A illustrates a tendril perversion in *Bryonia Dioica*. LS ration from *Sachs' Text-book of Botany*, published 1875, Oxford, Clarendon Press), A handedness reversal was described in twisting vines. The coiling vine can be attached at both ends. When fastened in this manner, a vine 438 can continue to grow thicker and longer with a twisting motion by having one half of the twisting section turning in a left hand direction 424 and the other section turning in the right hand direction 428. An untwisted portion 440 in between the twisted portions is known as a "tendril perversion".

Figure 4B:
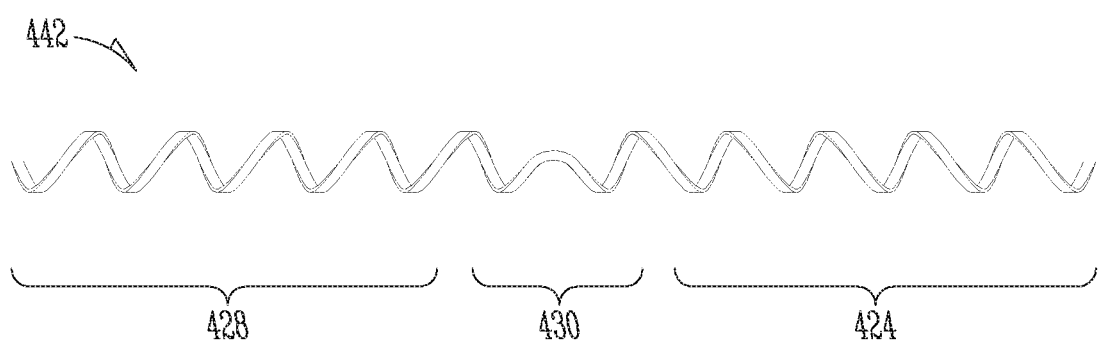
FIG. 4B illustrates a coiled telephone cable having a spontaneous helix hand reversal section.

FIG. 4B illustrates a coiled phone cable 442 having a spontaneous helix hand reversal section. The phenomenon can be produced in a cord 442 such as a coiled phone cord, by pulling the cord straight, untwisting the cord and then then slowly bringing the ends together. The cord 442 can then spontaneously twist into two sections having two different coiling directions with a hand reversal section 430 between them. The left side of the cord 442 is shown coiled in a right hand direction 428 and the right side of the cord 442 is shown coiled in a left hand direction 424.

FIG. 5 illustrates a method of introducing a cable 544 into a conduit 546. The conduit 546 can be a coiled tubing. Current practices may deploy the cable 544 (e.g. a fiber optic sensing cable) so as to generate multiple points of spontaneous helix hand reversal. The cable 544 is often pumped into the conduit 546 using fluid drag, with a pump 548 that can pump a fluid 550 at such a high velocity in the conduit 546 such that fluid drag will propel the cable 544 inside the conduit 546. A cable spool 552 is normally held in place using a cable spooler 554, and the cable 544 is fed into the conduit as the cable is being pulled into the conduit.

There may be an injection section 556 that may have mechanical means of pushing the cable 544 into a combiner section 558, and the cable 544 may have a stopper/flow restriction at the distal end of the cable 544 to allow the fluid 550 to drag the cable towards a distal end 560 of the conduit 546. A cable deployment system may utilize one or several of the three methods described above to deploy the cable within the conduit, e.g. push the cable into the conduit, propel the cable inside the conduit using fluid drag, and/or pull the cable forward using a stopper/flow restriction. The conduit 546 may be uncoiled on the ground during the sensing cable pump-in, or the conduit may sit on a large diameter spool during the cable deployment into the conduit 546. The conduit may be several thousand feet in length, and conduits in excess of 20,000 ft. may be used.

During deployment, the distal end of the cable 544 can at some time hit the distal end 560 of the conduit 546, and the cable 544 can then start to coil up against the inside diameter of the conduit. The cable 544 can often coil up symmetrically inside the conduit 546 like a helical spring. The cable 544 coiling can continue against the inside diameter of the conduit 546 in a helix until other forces cause a reversal of the helix coil direction. In this way, a torsional element/force in the cable 544 can build up over distance, and the cable 544 can then be subjected to a spontaneous helix hand reversal as described above in FIGS. 3A-C, and 4B. The cause for spontaneous helix hand reversal can be that the cable 544 can include a torsional stiffness and this torsional stiffness can at various points overcome a force that coils the cable like a helical spring in one direction. The spontaneous helix hand reversal can occur when the torsional stiffness is larger than the coiling force, and the rotation of the helix will then alternate between a left and right hand rotation/helix. Whether or not a helix is left or right handed after a spontaneous helix hand reversal is randomly chosen in nature.

When the conduit 546 (e.g. coiled tubing) is installed into a hydrocarbon producing well, the cable 544 may move inside the conduit 546. The movement may be augmented by fluid and proppant movement through the conduit 546 during a pumping job in the well. As described above, any hand reversal section in the cable 544 can impart mechanical stress and create a weak point in the cable 544. Cable and/or fluid movement may then damage the cable 544 at the weak point.

Figure 6:
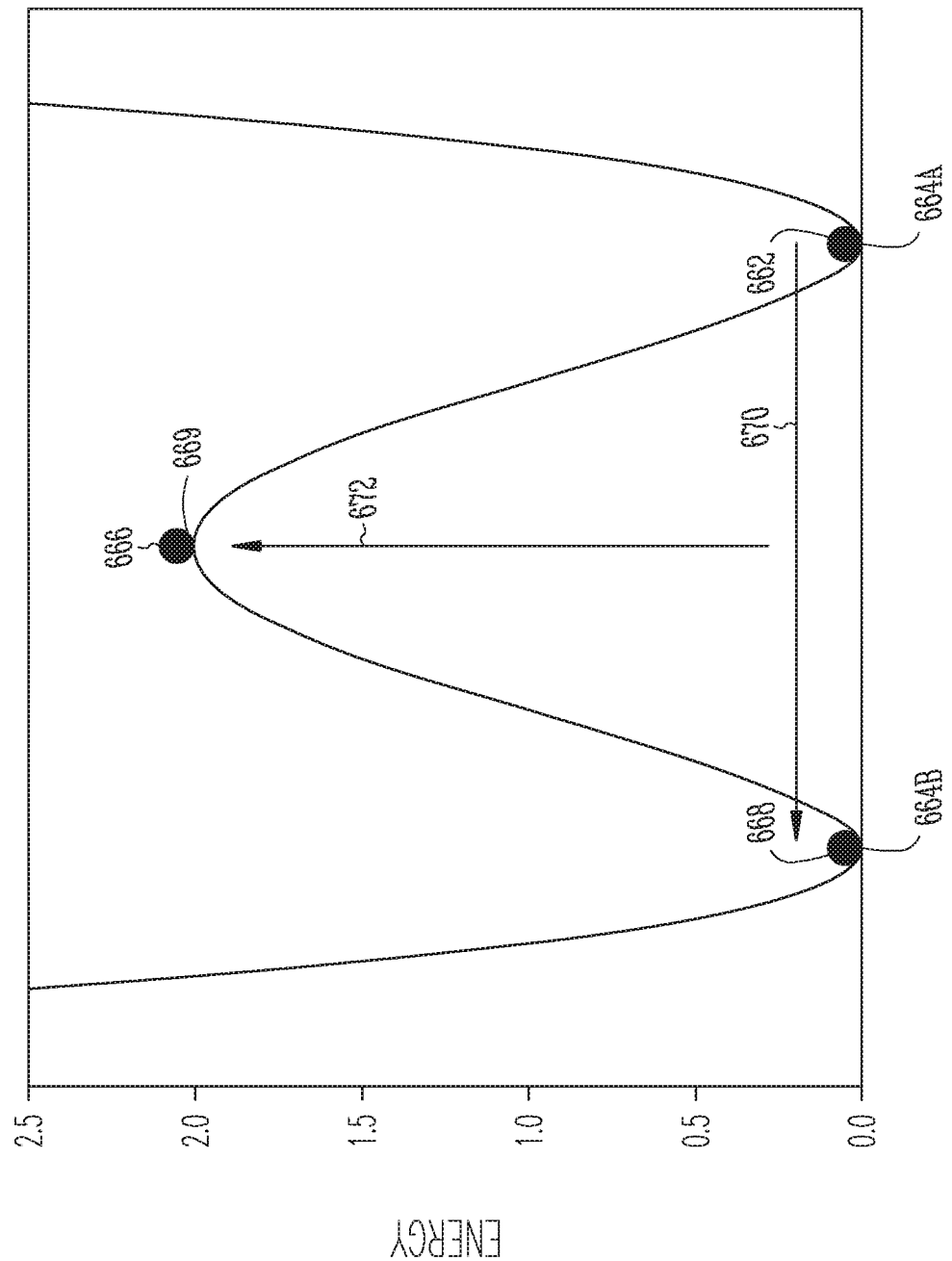
FIG. 6 illustrates a graph showing energy used in producing a hand reversal, in accordance with at least one example of the present disclosure.

FIG. 6 illustrates a graph showing energy used in producing a spontaneous helix hand reversal, in accordance with at least one example of the present disclosure. The graph shows energy states of three cable conditions. A right hand coiled cable 662 is shown at a low energy state 664A of zero. A left hand coiled cable 668 is also shown at a low energy state 664B of zero. A straightened cable 666 (e.g. untwisted) is shown at a high energy state 669 of two (the cable can retain its torsional stiffness). A helically coiled cable cannot reach an opposite condition of handedness without first being straightened to form the straightened cable 666. If the cable has been straightened in the conduit/coiled tubing then it can be in an unstable condition, corresponding to the high energy state 669, and once perturbed (e.g. put under compression or relaxed) it can spontaneously take form with portions being left or right handed. Once a helix is in either of the low energy states 664A-B, a certain amount of energy 672 is used in order to switch handedness. The amount of energy 672 used can be identical to the energy required to straighten the cable, e.g. there is no situation where 'tunneling' 670 from one low energy state 664A such as a right hand coiled cable 662 condition, to the other low energy state 664B, such as the left hand coiled cable 668 condition, or vice versa, is possible without first passing through the straightened cable 666 condition in the high energy state 669. Additionally, while placing the sensing cable into the coiled tubing it is possible for the helix to change handedness. Any number of things can cause this change in conditions, including variation of the pump rate or starting and stopping of the pumping process. Thus, there is no way to guarantee that the sensing cable will go into the coiled tubing, while staying in the desired condition. Once inside the coiled tubing, the only time the cable can switch handedness is when the cable is straightened. The apparatuses, systems, and methods described herein may operate to remove the randomness of cable condition by choosing the state that the helical cable occupies from the very beginning of the cable introduction into the conduit/coiled tubing. Herein also are described devices and methods that operate to impart enough energy to the cable that it will not likely be straightened out under foreseeable conditions on site. Systems are also described in which spontaneous hand reversal can be reduced, or eliminated.

FIGS. 7A-7B illustrate a schematic drawing of a cable introduction assembly 774, in accordance with at least one example of the present disclosure. The cable introduction assembly 774 can include a spool assembly 775 and a conduit assembly 776 and can provide a device for and method of introducing a cable 744 into a conduit 746. The cable 744 can be a fiber optic sensing cable that can be used for many downhole logging/sensing operations such as Distributed Temperature Sensing (DI'S) and Distributed Acoustic Sensing (DAS), and/or via coupling to pressure transducers, single point acoustic sensors, resistivity measuring devices, radiation measuring devices, chemical sensors, etc. The conduit 746 can be a coiled tubing for use in a downhole environment and as described above during the cable installation, can be laid straight upon the ground or coiled up in a spool, during the deployment of the cable 744 in to the conduit 746.

The conduit assembly 776 can include a section of conduit 746, an injection assembly 756, a pump assembly 777, a combiner assembly 778, a return line 779, and a reservoir 780. As described above, this conduit 746 can be quite lengthy, perhaps over 20,000 feet long. The conduit assembly 776 can include a proximal end 781 and a distal end 782. The injection assembly 756 and combiner assembly 778 may not be present in some embodiments, so for descriptive purposes, the cable 744 can be introduced into the proximal end 781 of the conduit assembly 776, regardless of whether it is the conduit 746 or another structure upstream from a conduit proximal end 783, such as the injection assembly 756 or the combiner assembly 778. When the conduit 746 is put into the ground, the distal end 782 can enter the ground first and the proximal end 781 can remain above the ground in a typical borehole deployment of coiled tubing.

Figure 7C:
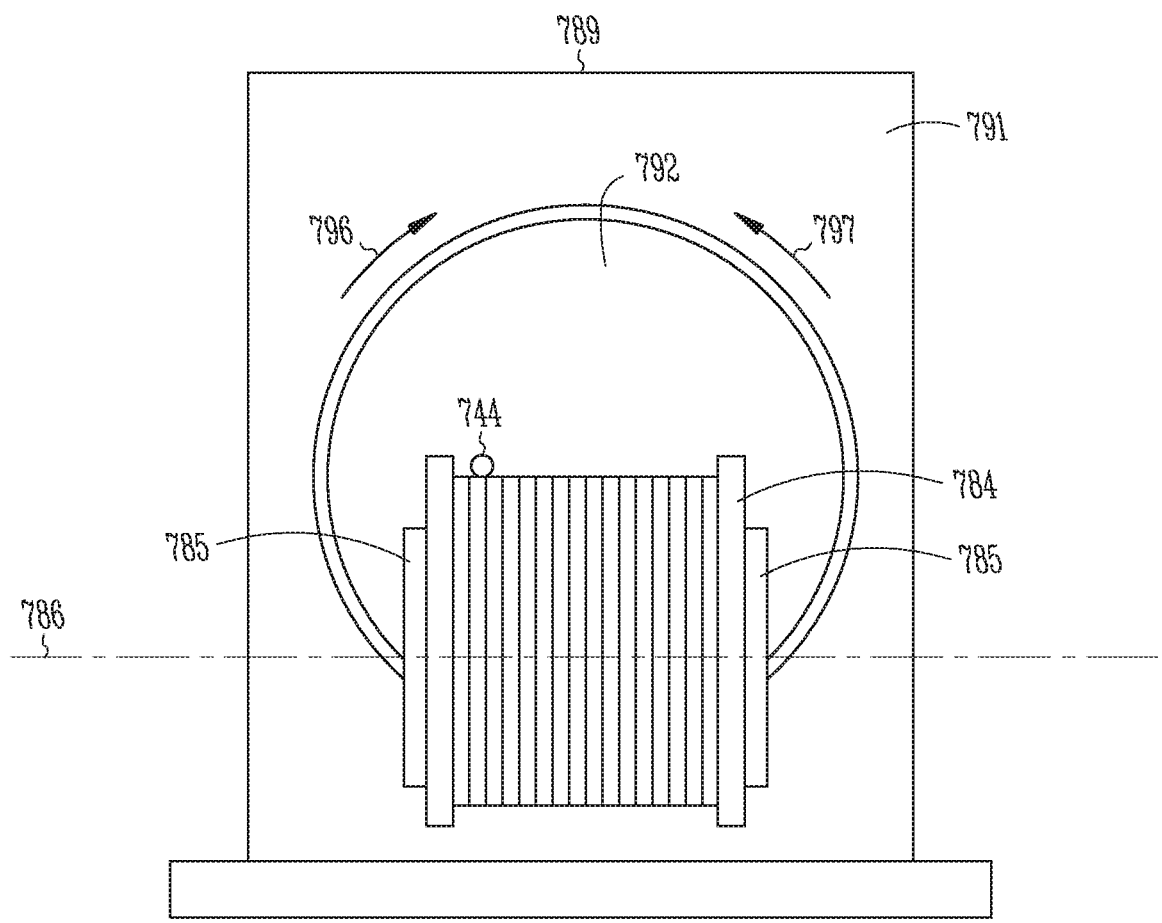
FIG. 7C illustrates a schematic drawing of a rotator assembly, in accordance with at least one example of the present disclosure.

The spool assembly 775 can include a spool 784, a spool mount assembly 785, a base 788 and a rotator assembly 789. The cable 744 can be wound around a first axis 786 of the spool 784. In FIG. 7A, the first axis 786 is generally perpendicular to the page and is represented as a point in the center of the spool 784. The base 788 can provide a stable platform upon which the spool assembly 775 can be fixed or rest upon. In an example, the base 788 can be truck mounted. The spool mount assembly 785 can be configured to allow the spool 784 to rotate about the first axis 786 as the cable 744 unwinds into the conduit 746. In an example, the unwinding can be controlled by the fluid flow in the conduit. In another example, the unwinding can be controlled by motor and/or braking mechanisms. In an example, a first motor 799 can control rotation of the spool about the first axis 786 in a clockwise or counter clockwise direction. A controller 773 can provide rotation direction, variable rotation speeds and/or braking. The rotator assembly 789 (see also FIG. 7C) can be configured to rotate the spool 784 about a second axis 790. The second axis 790 can be generally perpendicular to the first axis 786. The second axis 790 can be generally aligned with or be generally parallel to the direction of the conduit proximal end 783. The cable 744 can unwind front the spool 784 on a side 787 that is nearest to the second axis 790. FIG. 7A illustrates the cable unwinding from the top edge of the spool 784 as the spool mount assembly 785 is located near the base 788. In FIG. 7B, the rotator assembly 789 has rotated the spool mount assembly 785 180 degrees so that the spool mount assembly 785 is farther away from the base 788. As the rotator assembly 789 moves the spool 784, the cable 744 is being twisted and a handedness (e.g. left hand coil or right hand coil) can be applied to the cable 744 from the moment it enters the conduit assembly 776. A second motor 798 can provide power to the rotator assembly 789 to move the spool 784 about the second axis 790. The controller 773 can provide rotation direction, variable rotation speeds and/or braking for the second motor 798. In an example, the operations of the first motor 799 and the second motor 798 can be performed by a single motor, using any form of belts, pulleys, gears, or transmissions. In an example, each of the first and second motor 799, 798 can include a controller. The controller 773 can be remote from the cable spool assembly 775, such as the controllers 1015, 1115 described below in FIGS. 10-11.

FIG. 7C illustrates a schematic drawing of a rotator assembly 789, in accordance with at least one example of the present disclosure. The rotator assembly 789 can be configured to rotate the spool 784 about the second axis 790 (see FIG. 7A) in either a clockwise 796, or a counterclockwise 797 direction, depending on the handedness desired for the cable 744. The rotation can be a portion of a 360 degree cycle or any number of complete and/or partially complete 360 degree cycles. The cable 744 can unwind from the spool 784 as the spool rotates about the first axis 786. The rotator assembly 789 can be configured having a stationary portion 791 and a movable portion 792. The spool mount assembly 785 can be fixed to the movable portion 792. Although the cable 744 may not be perfectly aligned with the second axis 790, it can exit the spool 784 from an uppermost part of spool 784 when the spool 784 has been rotated near the base 788 and from a lowermost part of spool 784 when the spool 784 has been rotated away from the base 788 (see FIG. 7B). The cable 744 can be exiting from the spool 784 throughout the rotation of the spool 784 by the rotator assembly 789. The twisting of the cable 744 can be synchronized with the unwinding of the cable 744 to provide a selected number of cable twists per unit feet of cable 744 introduced into the conduit 746 (see FIG. 7B).

The rotator assembly 789 is shown having the stationary portion 791 outwards from the movable portion 792, however the rotation of the spool 784 about the second axis 790 can be accomplished in numerous other ways. In an example, the rotator assembly 789 can include a slot or track through which a movable mounting member can extend and retain the spool mount assembly and rotate the spool mount assembly around the second axis 790. In another example, the spool mount assembly can be rotably fixed at a central point of the spool and rotate about the second axis (so that the unwinding cable is able to oscillate farther away from the second axis than other examples of the device as described above).

FIG. 8. illustrates a schematic drawing of a cable introduction assembly 874, in accordance with at least one example of the present disclosure. In another example, the spool mount assembly 885 can be configured to retain the spool 884 such that the first axis 886 is generally parallel with the second axis 890. The cable 844 can be introduced into the proximal end 881 of the conduit assembly 876. A cable guide 893 can help funnel the cable 844 into the conduit 846. As the cable 844 is pulled from the spool 884 (e.g. by fluid pumped in conduit), it can retain a twisted configuration from being pulled off from the side of the spool 884 such that the cable 844 includes a handedness 894 as it enters the conduit 846. The spool 884 can be rotated (e.g., with a motor) about the first axis 886 in either a clockwise or counterclockwise direction to maintain a desired number of twists per unit length of cable 844 that has been deployed into the conduit 846. The conduit 846 can include a pre-former 895 near the proximal end. The pre-former 895 can alter the shape of the cable 844 such that it could be straighter or include additional twisting, coiling, or helical formation. The cable 844 can be a fiber in metal tube (FIMT) type cable and the metal can include a shape memory that can include a helix handedness 894. The pre-former can alter the shape of any metals, shape memory materials, or other materials in the cable 844.

FIG. 9 is a flowchart of a method of deploying a fiber optic cable into a conduit. The method 900 can comprise the acts of: 1) deploying the fiber optic cable into a proximal end of the conduit 901; 2) pumping a fluid into the conduit 902; 3) propelling the fiber optic cable with the pumped fluid towards a distal end of the conduit 903; and 4) twisting the fiber optic cable as it is deployed so the cable retains a handedness along its length in a deployed state 904. The method 900 can further comprise the acts of: 5) rotating a cable spool about a first axis while deploying the cable and also rotating the cable spool about a second axis perpendicular to the first axis 905; and/or 6) wherein the fiber optic cable is a fiber optic sensing cable configured to perform at least one of distributed temperature sensing (DTS) and distributed acoustic sensing (DAS) 906.

Any of the assemblies or devices described above can be used to accomplish the method 900. When the cable is twisted in step 904, the cable can be twisted to either have a left handed helix or a right handed helix in the deployed state. By initializing the cable with an imparted handedness as it enters the conduit, hand reversals can be reduced or eliminated.

Figure 10:
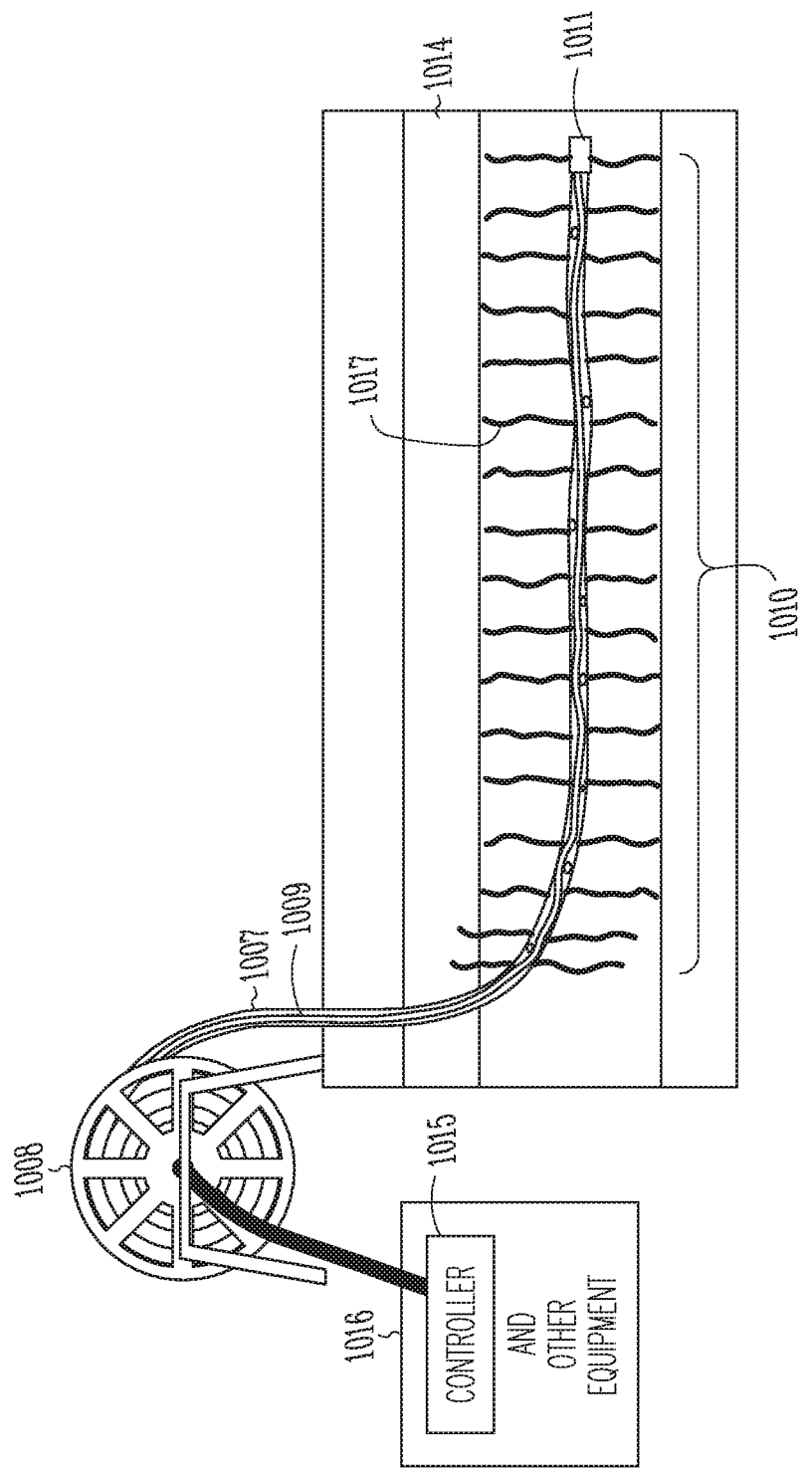
FIG. 10 is a diagram of a fiber optic sensing system in a coiled tubing example, in accordance with at least one example of the present disclosure.

FIG. 10 is an illustration of a coiled tubing operation in a wellbore, according to at least one example of the present disclosure. Coiled tubing 1007, as used herein, refers to a relatively long continuous metal pipe, typically having a diameter in a range of 1-3.5 inches that can be spooled on a reel 1008. The coiled tubing 1007 provides the ability to pump fluids through the coiled tubing 1007 and the tubing may be pushed into the wellbore rather than relying on gravity.

The tubing 1007 can include fiber optic cable 1009 deployed within the tubing 1007. The fiber optic cable 1009 can include a distributed sensor array 1010 (e.g., multi-function fiber optic). The distributed sensor array 1010 can provides localized measurement of pressure, temperature, fluid flow, and other hydrocarbon production parameters within the borehole.

In the case of the fiber optic cable 1009 distributed sensor array 1010, interferometric methods may be used based on a phase shift of the light pulse as a function of the quantity to be measured (e.g., electric or magnetic fields, acoustic vibrations, gravity, fluid or sand flow). The phase information can typically be extracted via mixing the phase shifted signal with a reference signal. In a fiber optic sensor, the interrogation beam and the reference beam may both be derived from the same beam using a beam splitter or optical coupler.

A bottom hole assembly (BHA) 1011 can be coupled to an end of the tubing 1007. The BHA 1011 may include real time bottom hole pressure gauges, for measuring pressure inside and outside of the BHA 1011 for well preparation, stimulation execution, and post stimulation activities within the wellbore. The BHA 1011 may further include a hydrajet tool apparatus for selectively fracturing or perforating the wellbore. The coiled tubing 1007, with the attached BHA 1011 and integral distributed sensor array 1010, can be inserted into the wellbore that is drilled through a geological formation 1014. The BHA 1011 may be initially placed near the toe of the well. The diagram illustrates a plurality of fractures 1017 in the formation 1014 that may be producing hydrocarbons.

In order to determine which zones are producing and which zones are not producing, the distributed sensor array 1010 in the tubing 1007 can be used to measure the distributed hydrocarbon production parameters, including temperature, acoustic signatures, and/or bottom hole pressures, in zones along the wellbore. These measurements are communicated to a controller 1015 on the surface for analysis.

Figure 11:
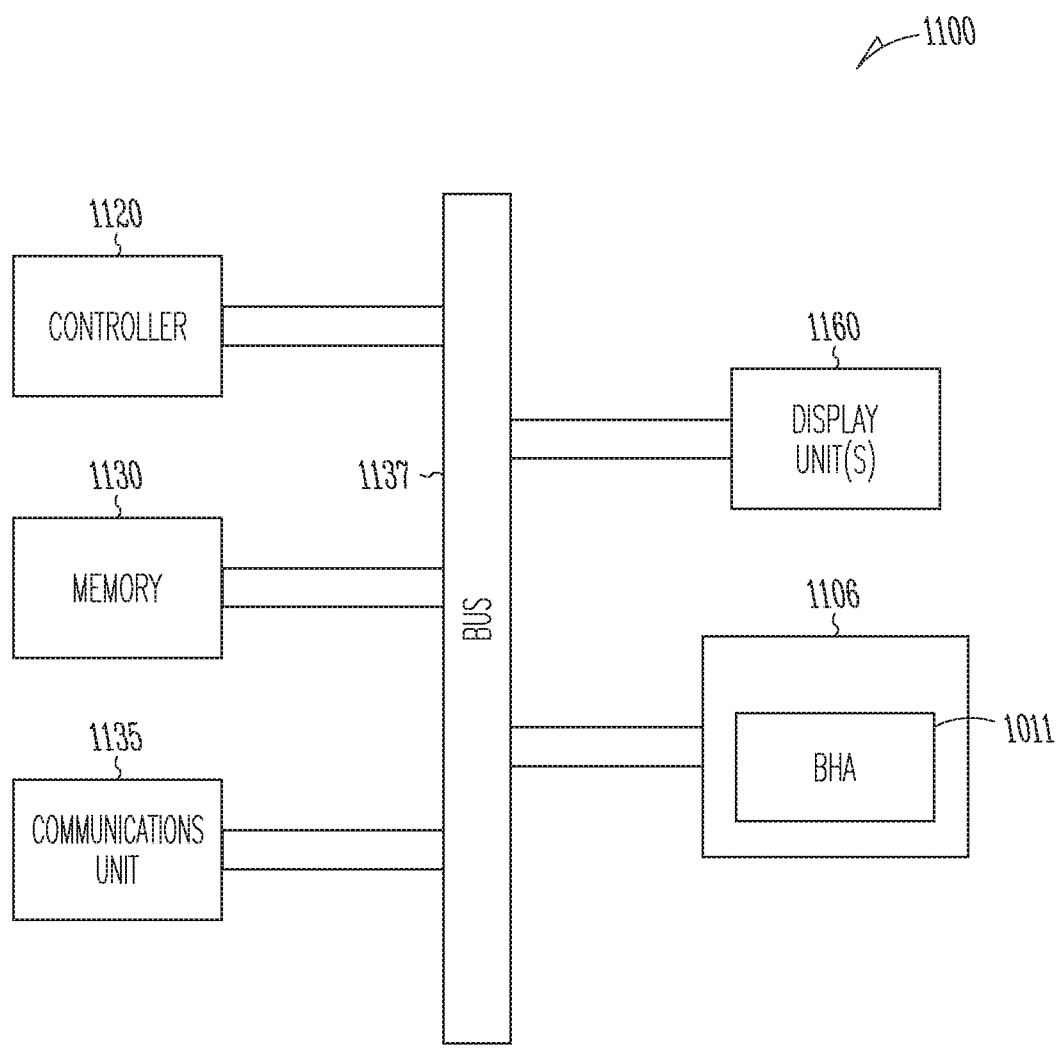
FIG. 11 is a block diagram of an example system operable to implement the activities of multiple methods, in accordance with at least one example of the present disclosure.

The controller 1015 and other equipment 1016 may be considered to be part of the coiled tubing system (e.g., controller 1015, coiled tubing 1007 distributed sensor array 1010). Another example of a controller 1115, that can be similar to controller 1015 is illustrated in FIG. 11 and described subsequently. The equipment may include the reel 1008 or some other equipment that is configured to move the coiled tubing 1007 with the distributed sensor array 1010 through the wellbore.

For example, if a fiber optic cable 1009 having the distributed sensor array 1010 is used, the controller 1015 may determine the production results of the current well by the phase change between light pulses and a reference light signal. The phase change in the light is indicative of the temperature, acoustic signature, and/or bottom hole pressures at various locations along the wellbore. Greater temperature, pressure, and/or acoustic signature in one location may be indicative of a producing zone as compared to another zone having a lower temperature, pressure, and/or acoustic signal.

Although the coiled tubing 1007 is illustrated as it is deployed in the formation 1014, a similar controller to the controller 1015 can be used if the coiled tubing 1007 is above ground during the introduction of the fiber optic cable 1009, such as cables 744 and 844, as described above as in FIGS. 7A-C and 8. A similar controller can be used to control any or all functions of the cable introduction assemblies as described above.

FIG. 11 is a block diagram of an example system 1100 operable to implement the activities of multiple methods, according to various examples of the disclosure. The system 1100 may include a tool housing 1106 including the BHA tool 1011 such as that illustrated in FIG. 10. The system 1100 of FIG. 11 may be connected to any of the assemblies, devices, and methods described and/or illustrated in FIGS. 7A-9 with reference to the controller 1015 and other equipment 1016. For example, a controller such as controllers 1015, 1115, or a similar controller can control operations of a cable introduction assembly as described above.

The system 1100 may include circuitry such as a controller 1115, a memory 1130, and a communications unit 1135. The memory 1130 may be structured to include logging data of previous well production. The controller 1115, the memory 1130, and the communications unit 1135 may be arranged to operate as a processing unit to control operation of the selective stimulation of reservoir targets and execute any methods disclosed herein.

For example, the processing unit may perform the measurements of the measured hydrocarbon production parameters from the distributed sensor array. The processing unit may further compare these measurements to prior logging data from prior well production. The processing unit may further control operation of the coiled tubing operation by controlling movement of the coiled tubing and, thus, the BHA 1011 through the wellbore to selected target locations for re-fracturing. In an example, the processing system can further control operation of any of the assemblies, devices or methods of the cable introduction assembly as the fiber optic cable is deployed into the coiled tubing by controlling movement/operations of the fiber optic cable, controlling movement/operations of the rotator assembly, controlling movement/operations of the spool, controlling movement/operations of the injection assembly, controlling movement/operations of the combiner assembly, or movement/operations of the pump assembly as described above.

The communications unit 1135 may include down hole communications for appropriately located sensors in a wellbore. Such down hole communications can include a telemetry system. The communications unit 1135 may use combinations of wired communication technologies and wireless technologies at frequencies that do not interfere with on-going measurements. The communications unit 1135 or a similar communications unit can perform communications with the cable introduction assembly as described above, when the coiled tubing 1007 (see FIG. 10) is above ground as in FIGS. 7-9.

The system 1100 may also include a bus 1137, where the bus 1137 provides electrical conductivity among the components of the system 1100. The bus 1137 can include an address bus, a data bus, and a control bus, each independently configured or in an integrated format. The bus 1137 may be realized using a number of different communication mediums that allows for the distribution of components of the system 1100. The bus 1137 may include a network. Use of the bus 1137 may be regulated by the controller 1115.

The system 1100 may include display unit(s) 1160 as a distributed component on the surface of a wellbore, which may be used with instructions stored in the memory 1130 to implement a user interface to monitor the operation of the tool 1106, the distributed sensor array 1010 (see FIG. 10), or other components distributed within the system 1100. Such a user interface may be operated in conjunction with the communications unit 1135 and the bus 1137. Many examples may thus be realized.

These implementations may include a machine-readable storage device having machine-executable instructions, such as a computer-readable storage device having computer-executable instructions. Further, a computer-readable storage device may be a physical device that stores data represented by a physical structure within the device. Such a physical device is a non-transitory device. Examples of machine-readable storage devices may include, but are not limited to, read only memory (ROM), random access memory (RAM), a magnetic disk storage device, an optical storage device, a flash memory, and other electronic, magnetic, and/or optical memory devices.

This Detailed Description describes example embodiments of the disclosure with reference to the accompanying drawings, which depict various details of examples that show how various aspects of the disclosure may be practiced. The discussion addresses various examples of novel methods, systems, devices and apparatuses in reference to these drawings, and describes the depicted embodiments in sufficient detail to enable those skilled in the art to practice the disclosed subject matter. Many embodiments other than the illustrative examples discussed herein may be used to practice these techniques. Structural and operational changes in addition to the alternatives specifically discussed herein may be made without departing from the scope of this disclosure.

In this description, references to "one embodiment" or "an embodiment," or to "one example" or "an example" in this description are not intended necessarily to refer to the same embodiment or example; however, neither are such embodiments mutually exclusive, unless so stated or as will be readily apparent to those of ordinary skill in the art having the benefit of this disclosure. Thus, a variety of combinations and/or integrations of the embodiments and examples described herein may be included, as well as further embodiments and examples as defined within the scope of all claims based on this disclosure, as well as all legal equivalents of such claims.

As used herein, "axial" and "longitudinal" refer to any rectilinear direction at least approximately parallel to a rotational axis of a rotary component with which non-rotary components of a rotary assembly under discussion are sealingly engaged (for clarity of description being referred to hereafter simply as "the rotary axis"), "radial" refers to directions extending at least approximately along any straight line that intersects the rotary axis and lies in a plane transverse to the rotary axis; "tangential" refers to directions extending at least approximately along any straight line that does not intersect the rotary axis and that lies in a plane transverse to the rotary axis; and "circumferential" or "rotational" refers to any curve line that extends at least approximately along an arcuate or circular path described by angular movement about the rotary axis of a point having a fixed radial spacing from the rotary axis during the annular movement, "Rotation" and its derivatives mean not only continuous or repeated rotation through 360° or more, but also includes angular or circumferential displacement of less than a full revolution.

In the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Many embodiments may be realized. Several examples will now be described.

In Example 1, a cable introduction assembly can comprise: a spool assembly including: a spool having a first axis, the spool configured to retain a cable wound around the first axis in an undeployed mode; and a spool mount assembly configured to retain the spool and introduce the cable in a deployed mode into a conduit configured for a downhole environment, the conduit having a proximal end and a distal end, the cable in the deployed mode extending from the proximal end towards the distal end, wherein the spool assembly is configured to provide a handedness to the cable in the deployed mode.

In Example 2, the cable introduction assembly of Example 1 can optionally be configured such that the spool assembly includes a rotator assembly that is configured to rotate the spool about a second axis that is generally perpendicular to the first axis.

In Example 3, the cable introduction assembly of Example 2 can optionally be configured such that the second axis is generally aligned with the conduit proximal end.

In Example 4, the cable introduction assembly of any one or any combination of Examples 2-3 can optionally be configured such that the rotator assembly is configured to rotate the spool mount assembly through at least one 360 degree cycle.

In Example 5, the cable introduction assembly of any one or any combination of Examples 1-4 can optionally be configured such that the cable comprises a fiber optic sensing cable.

In Example 6, the cable introduction assembly of Example 5 can optionally be configured such that the fiber optic sensing cable is configured to perform at least one of Distributed Temperature Sensing (DTS) and Distributed Acoustic Sensing (DAS).

In Example 7, the cable introduction assembly of any one or any combination of Examples 1-6 can optionally be configured to further comprise an injection assembly coupled to the proximal end of the conduit, the injection assembly configured to push the cable towards the conduit distal end.

In Example 8, the cable introduction assembly of any one or any combination of Examples 1-7 can optionally be configured to further comprise a pump assembly configured to pump a fluid into and through the conduit, wherein a fluid velocity associated with the fluid is applied to transport the cable in the conduit.

In Example 9, the cable introduction assembly of Example 8 can optionally be configured to further comprise a combiner assembly coupled between the pump assembly and the conduit and configured to provide a transitional channel for fluid leaving the pump assembly and entering the conduit.

In Example 10, the cable introduction assembly of any one or any combination of Examples 8-9 can optionally be configured to further comprise a flow restrictor coupled near a cable distal end and configured to trap fluid as the cable is transported in the conduit.

In Example 11, the cable introduction assembly of Example 1 can optionally be configured such that the spool mount assembly retains the spool such that the first axis is generally aligned with the conduit proximal end.

In Example 12, the cable introduction assembly of any one or any combination of Examples 1-11 can optionally be configured to further comprise a pre-former coupled near the conduit proximal end and configured to alter the shape of the cable.

In Example 13, a downhole tool sensing system, the system can comprise: a spool assembly including a spool having a first axis, the spool configured to retain a fiber optic cable wound around the first axis in an undeployed mode; a spool mount assembly configured to retain the spool and introduce the fiber optic cable in a deployed mode into a conduit configured for a downhole environment, the conduit having a proximal end and a distal end, the fiber optic cable being transported from the proximal end towards the distal end, the spool mount assembly configured to provide a handedness to the fiber optic cable in the deployed mode, and a motor configured to move the spool.

In Example 14, the system of Example 13 can optionally be configured to further comprise a controller configured to control operations of the motor.

In Example 15, the system of any one or any combination of Examples 13-14 can optionally be configured such that the spool mount assembly includes a rotator assembly that is actuated by the motor to rotate the spool about a second axis that is generally perpendicular to the first axis.

In Example 16, the system of Example 15 can optionally be configured such that the rotator assembly is configured to rotate the spool mount assembly through at least one 360 degree cycle.

In Example 17, the system of any one or any combination of Examples 13-16 can optionally be configured such that the motor is configured to rotate the spool about the first axis.

In Example 18, a of deploying a fiber optic cable into a conduit can comprise: deploying the fiber optic cable into a proximal end of the conduit; pumping a fluid into the conduit; propelling the fiber optic cable with the pumped fluid towards a distal end of the conduit; and twisting the fiber optic cable as it is deployed into the conduit so that the fiber optic cable retains one of a left handedness or a right handedness along its length in a deployed state.

In Example 19, the method of Example 18 can optionally be configured to further comprise rotating a cable spool about a first axis while deploying the cable, wherein the twisting is provided by rotating the cable spool about a second axis perpendicular to the first axis, the second axis generally aligned with the proximal end of the conduit.

In Example 20, the method of any one or any combination of Examples 18-19 can optionally be configured such that the fiber optic cable comprises a fiber optic sensing cable configured to perform at least one of Distributed Temperature Sensing (DTS) and Distributed Acoustic Sensing (DAS).

In Example 21, a downhole tool sensing system, the system can comprise: a coiled tubing configured for a downhole environment, the coiled tubing having a proximal end and a distal end; and a fiber optic sensing cable located within the coiled tubing, the fiber optic cable being coiled throughout its length in a single handedness direction, Wherein the fiber optic sensing cable is configured to perform at least one of Distributed Temperature Sensing (DTS) and Distributed Acoustic Sensing (DAS).

In Example 22, the assemblies, systems, or methods of any one or any combination of Examples 1-21 can optionally be configured such that all elements, operations, or other options recited are available to use or select from.

This disclosure is intended to cover any and all adaptations or variations of various embodiments. Combinations of the above embodiments, and other embodiments not specifically described herein, will be apparent to those of skill in the art upon reviewing the above description.

We claim:

1. A cable introduction assembly for use with a conduit configured for a downhole environment, the cable introduction assembly comprising:
    a spool assembly including:
        a spool having a first axis, the spool configured to retain a cable wound around the first axis; and
        a spool mount assembly operable to introduce the cable into the conduit, the conduit having a proximal end and a distal end, and comprising a rotator assembly that rotates the spool about a second axis that is offset from the first axis to provide a selected handedness and a selected number of cable twists per unit feet to the cable as the cable is introduced into the conduit such that the cable retains the handedness along its length to reduce spontaneous helix hand reversal within the conduit.

2. The cable introduction assembly of claim 1, wherein the second axis is generally aligned with the conduit proximal end.

3. The cable introduction assembly of claim 1, wherein the rotator assembly is configured to rotate the spool mount assembly through at least one 360 degree cycle.

4. The cable introduction assembly of claim 1, wherein the cable comprises a fiber optic sensing cable.

5. The cable introduction assembly of claim 4, wherein the fiber optic sensing cable is configured to perform at least one of Distributed Temperature Sensing (DTS) and Distributed Acoustic Sensing (DAS).

6. The cable introduction assembly of claim 1, further comprising an injection assembly coupled to the proximal end of the conduit, the injection assembly configured to push the cable through the conduit towards the conduit distal end, wherein the cable maintains its handedness as it is pushed through the conduit.

7. The cable introduction assembly of claim 1, further comprising a pump assembly configured to pump a fluid into and through the conduit, wherein a fluid velocity associated with the fluid is applied to transport the cable in the conduit.

8. The cable introduction assembly of claim 7, further comprising a combiner assembly coupled between the pump assembly and the conduit and configured to provide a transitional channel for fluid leaving the pump assembly and entering the conduit.

9. The cable introduction assembly of claim 7, further comprising a flow restrictor coupled near a cable distal end and configured to trap fluid as the cable is transported in the conduit.

10. The cable introduction assembly of claim 1, wherein the spool mount assembly retains the spool such that the first axis is generally aligned with a conduit proximal end.

11. The cable introduction assembly of claim 1, further comprising a pre-former coupled near the conduit proximal end and configured to alter the shape of the cable.

12. The cable introduction assembly of claim 1, wherein the second axis is generally perpendicular to the first axis and the spool assembly is further configured to rotate the spool about the second axis such that the cable unwinds from the spool on a side that is nearest to the second axis.

* * * * *